June 17, 1930.　　　G. W. WOOLLEY　　　1,764,486
PARKING GEAR FOR MOTOR VEHICLES
Filed Sept. 17, 1927　　9 Sheets-Sheet 1

Inventor
George W. Woolley.
by Hazard & Miller
Attorneys.

June 17, 1930.                G. W. WOOLLEY                1,764,486
                        PARKING GEAR FOR MOTOR VEHICLES
                        Filed Sept. 17, 1927    9 Sheets-Sheet 3

Fig. 4.

Inventor
G. W. Woolley
Hazard & Miller
by
Attorneys.

June 17, 1930.　　　G. W. WOOLLEY　　　1,764,486
PARKING GEAR FOR MOTOR VEHICLES
Filed Sept. 17, 1927　　9 Sheets-Sheet 8

Inventor
George W. Woolley.
by Hazard Miller.
Attorneys

Fig. 18.

Patented June 17, 1930

1,764,486

UNITED STATES PATENT OFFICE

GEORGE W. WOOLLEY, OF PASADENA, CALIFORNIA

PARKING GEAR FOR MOTOR VEHICLES

Application filed September 17, 1927. Serial No. 220,247.

My invention is a parking gear for motor vehicles to enable the vehicle to be elevated off of the regular running wheels on transverse parking wheels, moved to the curb, lowered if desired, and moved out again from the curb and then lowered on the regular running wheels.

An object of my invention is the construction of a parking gear for motor vehicles, of the type above described, in which the driving power of the engine propelled vehicle or of the motor of an electrically operated vehicle may be used to furnish the power to raise the vehicle from being supported by the running wheels to a support on the parking wheels.

Another object of my invention is utilizing the main motor power of the vehicle to shift the vehicle bodily to one side or the other for parking at a curb or the like after being raised, and vice versa, the power for propelling the vehicle may be used for moving such vehicle from the curb and lowering it on the running wheels, at the same time raising the parking wheels a sufficient clearance above the ground.

A more detailed object of my invention is in connection with the propeller shaft which communicates a drive to one of the axle housings to mount a shiftable transmission therein, so that a propeller shaft may drive the vehicle for ordinary locomotion, or by shifting of the clutch a pair of transverse shafts may be actuated.

Another detailed object of my invention is by the rotation of the transverse shafts in co-operation with a second clutch, shifting an arm having a segmental gear and with a parking wheel secured to such arm, thereby raising the vehicle and carrying the weight on the parking wheels.

Another detailed object of my invention is having tubular shafts connecting between the front and the back of the vehicle to carry the arms with the parking wheels thereon so that these will be simultaneously shifted from a raised to a supporting position.

Another detailed object of my invention is by use of a second clutch to operate a transmission which, after the vehicle is raised on the parking wheels, may be utilized to rotate a pair of these wheels to shift the vehicle to a suitable parking place.

Another feature of my invention is automatically disengaging the raising gear when the vehicle is elevated to the full extent and holding the clutch out of such gear until the clutch is manually operated in the reverse motion of the engine to raise the parking wheels.

The changes made in the propeller shaft connection to the differential comprise a propeller shaft housing having part of the propeller shaft rotatably mounted therein and in alignment therewith a stud shaft for driving the differential. This stud shaft carries a substantial gear which may be engaged by a clutch slidable on the propeller shaft, and operated by a foot pedal or the like in the driver's compartment. This clutch is normally in position for driving the vehicle, the clutch being of suitable character to give rotation in either direction, for forward travel or backing. The clutch is also shiftable into a neutral position, and on a further shift into engagement with a gear rotatably mounted on the propeller shaft, this gear operates a gear on a short transverse shaft. This short transverse shaft communicates power by means of universal joints to two lateral shafts which operate, as hereunder set forth.

In constructing the raising, lowering and transverse motion features of my invention I secure suitable brackets to the rear axle housing and to the front axle. On these brackets I journal a pair of tubular shafts. Adjacent the rear axle bracket I have a gear casing with a rotatable shaft in each casing which may be driven from the inserted gear train in the propeller shaft. A substantial arm with a segmental gear is mounted in the casing, being secured to each tubular shaft, and has a parking wheel secured thereto. At the front of the vehicle on each side there is an arm secured to each of the tubular shafts with a parking wheel secured thereto, these being shifted by the oscillating hollow shaft to raise the vehicle from the running position to parking position.

On one side of the vehicle I have a shaft in the tubular shaft and this is connected to a gear in the housing of the parking arrangement, and by operating a clutch connected to the driver's compartment, the power may be transmitted from the lateral shafts through a gear train and rotate the parking wheels on one side of the vehicle, hence moving the vehicle either one side or the other, in accordance with the direction of rotation of the propeller shaft, that is, whether this be in a forward direction for forward travel or reverse or backing rotation.

A feature of my invention is the simplicity of control; for instance, a foot clutch connects and disconnects the propeller shaft from the mechanism for raising and lowering the vehicle onto the parking wheels and returning it from the parking wheels to the running wheels. Then to shift the vehicle laterally for parking, a hand lever is actuated. This causes the rotation of the parking wheels. In addition to this, there is the safety feature of the interlocking of the foot pedal and the hand lever. My invention also involves another safety factor in that when the parking wheels are fully raised or lowered to their full extent, the mechanism for raising and lowering these wheels is automatically disconnected.

Another shift of the hand lever actuates the lateral motion mechanism for shifting the vehicle bodily to one side, such as to the right for parking. A third motion of the hand levers lowers the car, if desired, onto its ordinary wheels. By the first manipulation of the lever the vehicle may be elevated again, and with the propeller shaft operating in a reverse direction and a fourth movement of the hand lever, the vehicle is shifted from the parking position laterally. The fifth movement of the hand lever controls the raising of the parking wheels and when these are raised the hand clutch is automatically thrown out of operation.

My invention will be more readily understood from the following description and drawings, in which.

The connection to the propeller shaft is substantially as follows, being illustrated particularly in Figs. 1, 2, 3, 4 and 5:

The rear axle housing is indicated by the numeral 11 having a differential housing 12, and extending forwardly of this and rigidly clamped thereto there is a propeller shaft housing 13. This has a stationary sleeve 14 secured therein, the forward end of the sleeve having a screw-threaded connection 15. The propeller shaft 16 has a coupling 17 for connection to a universal joint to connect with a propeller shaft driven from a transmission when an engine is used, or from an electric motor or a transmission when an electric drive is used for the vehicle.

Figure 5:
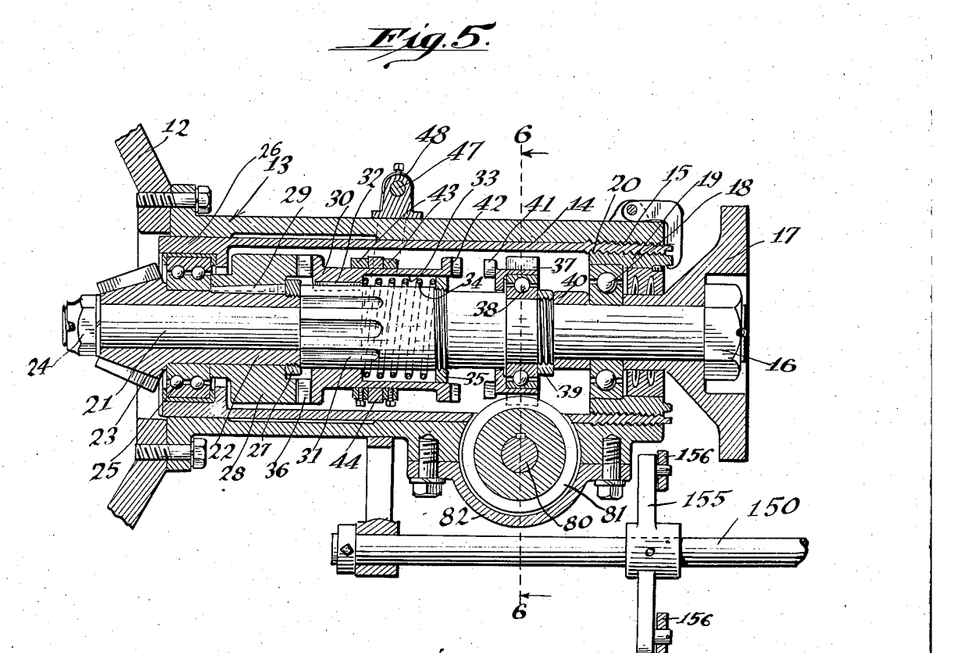
Figure 5 is a detail longitudinal section on the line 5—5 of Fig. 1 in the direction of the arrows showing the interconnection with the propeller shaft and the differential of the vehicle.

The propeller shaft has antifriction bearings 18 engaging between the shaft and a short sleeve 19 which is connected to the sleeve 14 by a screw-threaded connection 20 or the like. The rear end 21 of the propeller shaft 16 has a sleeve 22 rotatable thereon, this sleeve having a driving pinion 23 integral therewith to mesh with the ring gear of the differential. The sleeve is held in place on the shaft by a nut 24 in the usual manner. An antifriction bearing 25 forms a journal between the sleeve 22 and the inner end 26 of the sleeve 14. A nut 27 at the forward end of the sleeve 22 secures a clutch block 28 which is secured to the sleeve 22 by a key 29 or the like.

A clutch collar 30 is slidably mounted on the inner part 31 of the propeller shaft 16, this having a series of interengaging splines and keys 32 with the propeller shaft. The forward end of this collar has an annular recess 33 in which is mounted a compression spring 34, this spring bearing against a ring 35 which is threaded on the propeller shaft. This spring normally forces the clutch teeth 36 of the collar 30 into engagement with the clutch teeth on the clutch block 28, thus forming a driven connection between the propeller shaft 16, the clutch block 28 and the sleeve 22.

A driving gear 37 which is somewhat of a worm or helical type is mounted on an antifriction bearing 38 secured to the propeller shaft 16 and held in place by a threaded nut 39 and a loose ring 40 between the nut 39 and the inner race of the antifriction bearing 18. This gear has clutch teeth 41 to engage with the clutch teeth 42 on the outer end of the collar 30 opposite the clutch teeth 36.

Figure 2:
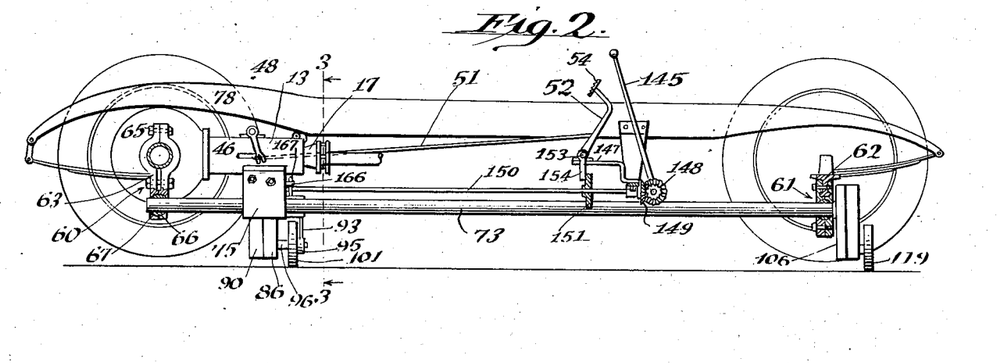
Figure 2 is a vertical longitudinal section taken substantially on the line 2—2 of Fig. 1 in the direction of the arrows.
Figure 3:
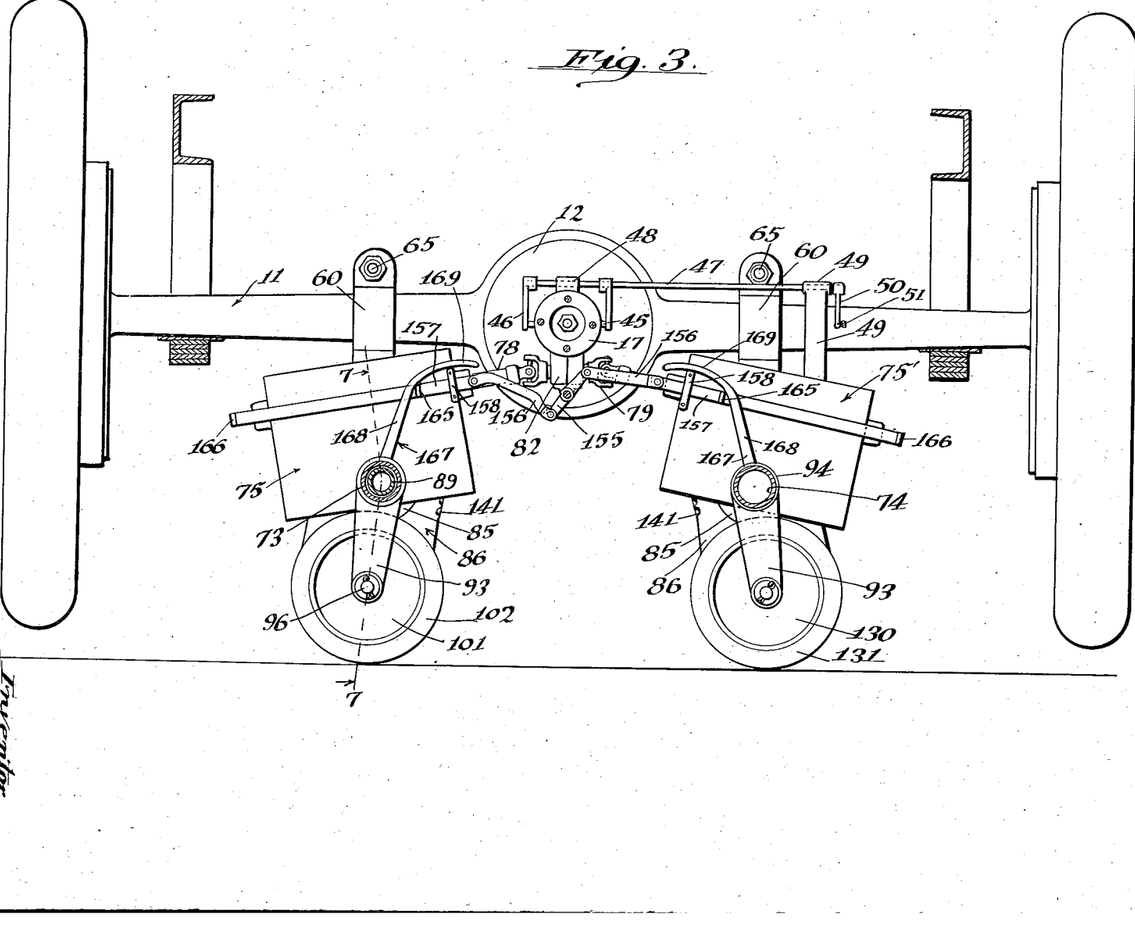
Figure 3 is a vertical transverse section on the line 3—3 of Figs. 1 or 2 in the direction of the arrows, showing the vehicle supported on the parking wheels.
Figure 4:
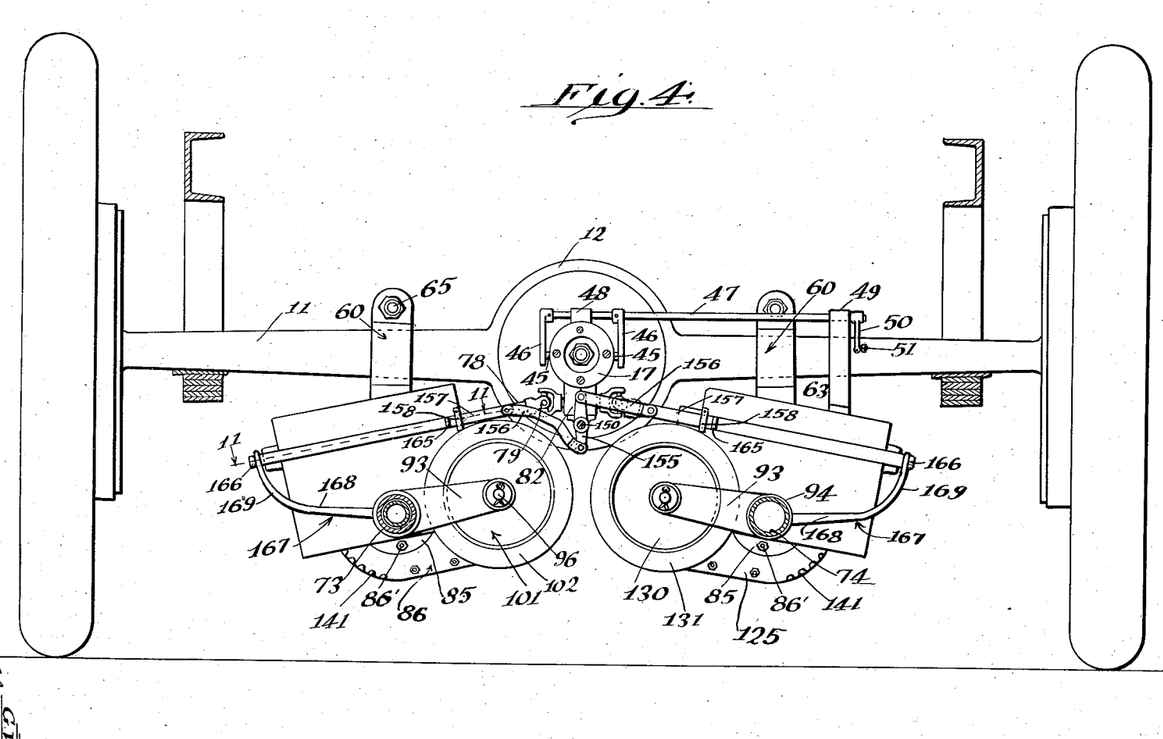
Figure 4 is a view similar to Fig. 3 showing the vehicle supported on the running wheels and with the parking wheels elevated.

The clutch collar 30 is shifted as follows, having reference particularly to Figs. 1, 2, 3, 4 and 5:

A pair of rings 43 are fixedly secured to the outside of the collar 30 and have a slip ring 44 therebetween (Fig. 5). This ring is engaged by pins 45 attached to arms 46 mounted on a rock shaft 47, this rock shaft being journaled in a bracket 48 on the propeller shaft housing 13 and on a bracket 49 secured to the transverse mechanism housing hereunder described, or in any suitable position. An operating arm 50 is connected to the end of a rock shaft 47 and by means of a link 51 connects to the lever 52 pivotally mounted as indicated at 53 on a suitable part of the vehicle chassis, this lever preferably being a foot pedal and having a head 54 to be engaged by a person's foot (Figs. 2, 3, and 4).

The manner of operation and functioning of the mechanism so far described is substantially as follows:

It will be understood that the propeller shaft 16 may be driven in either direction of rotation to operate the vehicle for forward or reverse drive, this being by the usual manipulation of the transmission for an engine driven vehicle, or by operating the electric motor for a motor drive. When the clutch collar 30 is in the position shown in Fig. 5, this being the normal position, the driving force is transmitted from the propeller shaft 16 to the clutch collar 30, hence by the teeth 36 to the clutch block 28, thence to the sleeve 22; hence causing the pinion 23 to operate the differential. This manifestly functions at any speed of the propeller shaft in either direction. In this operation the sleeve 22 and the propeller shaft 16 rotate together but in other operations the shaft is free to move while the sleeve remains stationary, as hereunder set forth.

Figure 6:
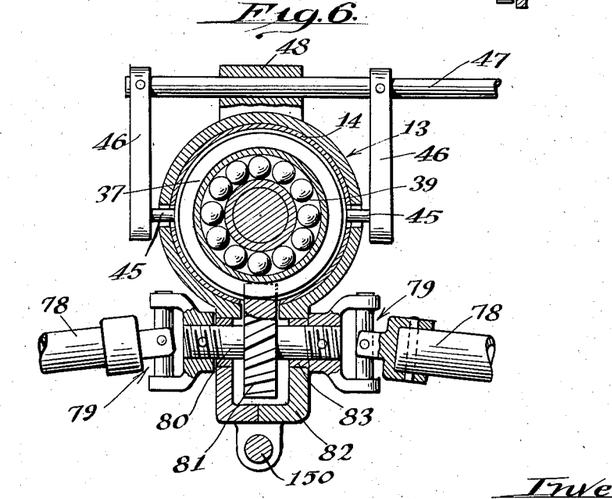
Figure 6 is a transverse section on the line 6—6 of Fig. 5 in the direction of the arrows.

Pressure of the foot pedal 52 draws on the link 51, hence rocking the arm 50 forwardly, rocking the shaft 47 and actuating the arms 46 to bring pressure on the ring 44; thereby through the medium of the fixed rings 43 shifting the collar 30 forwardly on the propeller shaft 16. The pins 45 operate through slots in the propeller shaft housing 13 Fig. 6. The forward movement of the clutch 30 first disengages this clutch from the clutch block 28 and in a further movement engages the clutch teeth 42 on the clutch collar 30 with the clutch teeth 41 on the gear 37, thus transmitting rotary motion to this gear in accordance with the direction in which the propeller shaft 16 is rotated. In an engine drive it is usual to have the engine either in low gear or in reverse gear for the drive of the gear 37.

Figure 8:
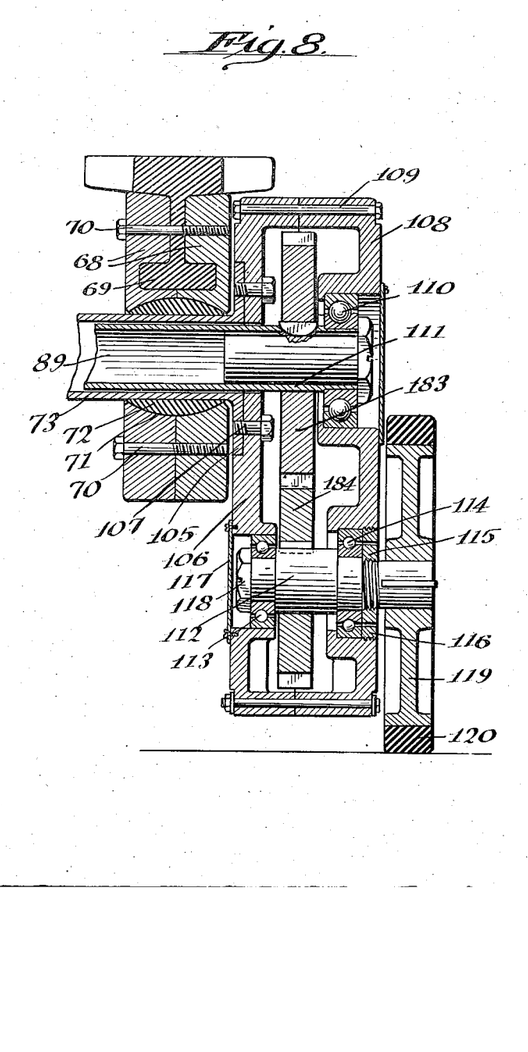
Figure 8 is a detail vertical longitudinal section on the line 8—8 of Fig. 1 in the direction of the arrows, showing the forward end and the driven parking wheels.
Figure 9:
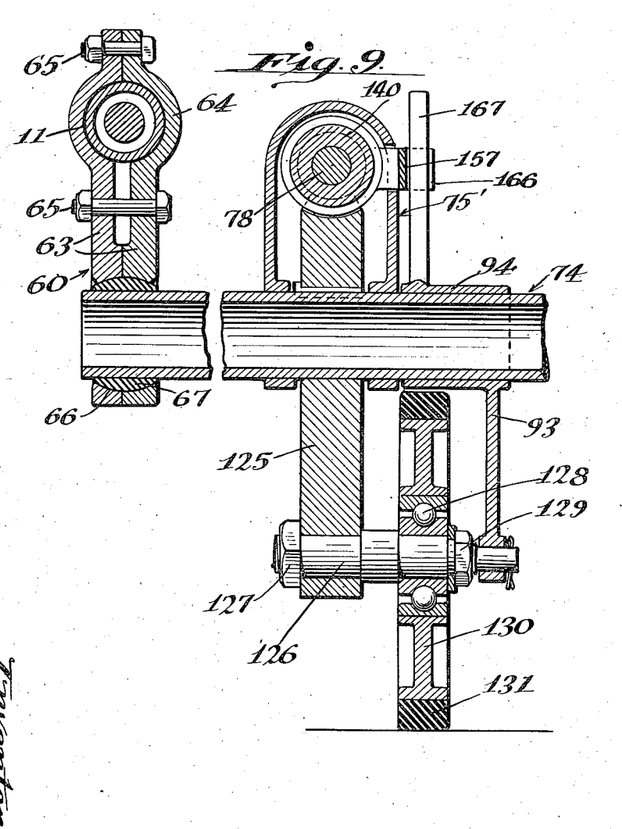
Figure 9 is a detail longitudinal section on the line 9—9 of Fig. 1 in the direction of the arrows, showing one of the non-driven parking wheels at the rear end.

The general layout for the raising and lowering mechanism is substantially as follows, having reference particularly to Figs. 1, 2, 3, 4, 7, 8, 9 and 10:

A pair of substantial brackets 60 depend from the rear axle housing 11 and also a pair of front brackets 61 depend from the front axle 62. These may be of any suitable character. The brackets on the rear axle housing are shown as having two plates 63 with a circular section 64 secured together by bolts 65. They have a curved bearing section 66 with a curved bushing 67 fitted therein (Fig. 9). The forward bracket 61 is illustrated as having a pair of plates 68 having recesses to engage the lower flange 69 of the front axle. These plates are bolted together by bolts 70 and have an arcuate bearing 71 with arcuate bushings 72 therein (Fig. 8). Tubular shafts 73 and 74 are journaled in these brackets on the bushings, thus forming a rocking connection between the front and rear axle.

Adjacent the propeller shaft housing 13 there are transmission mechanism housings 75 and 75' mounted on each of the tubular shafts 73 and 74. These housings have bearings 76 and 77 for transverse shafts 78 (Fig.

11). These shafts are connected by universal joints 79 to the short shaft 80 having a gear 81 mounted thereon and enclosed in a housing 82 depending from the drive shaft housing 13, the short shaft 80 having suitable bearings 83. The gears 37 and 81 mesh, having a type of worm or helical thread to allow rotation of the shaft 80 by rotation of the gear 37 when the clutch collar 30 is connected to the gear 37, this being then driven by the propeller shaft 16 (Figs. 4, 5, 6 and 11).

The tubular shaft 74 illustrated on the left hand side of the vehicle is continuous, being a single shaft, between the front and rear brackets; but the shaft 73 is discontinuous and has a flange 85 connected to a rock arm 86 by bolts 86' (Fig. 7), this rock arm having an antifriction bearing 87 on the enlarged end 88 of an inner tubular shaft 89. The large end of this shaft 89 is journaled in the rear bracket suspended from the rear axle housing on the right hand side of the vehicle. A casing plate 90 is secured to the arm 86 by bolts 91 or the like and has an antifriction bearing 92 engaging with the enlarged end 88 of the shaft 89. This construction in effect forms a substantial shaft between the rear bracket 60 and the front bracket 61 on the right hand side of the vehicle, the elements being the large end of the shaft 89 and the shaft 73.

The parking wheel at the rear end is mounted as follows having reference particularly to Figs. 3, 4 and 7:

A yoke arm 93 has a hub 94 journaled on the shaft 73 and has an outer journal 95 for the parking wheel shaft 96 at its outer end, this shaft having antifriction bearings 97 on the arm 86, and antifriction bearings 98 on the casing plate 90; thus forming a rigid shaft, the shaft being firmly secured by a nut 99 which is accessible through a cover plate 100. On the shaft between the yoke arm 93 and the arm 86 there is keyed a parking wheel 101 which preferably has a solid rubber tire 102.

Figure 1:
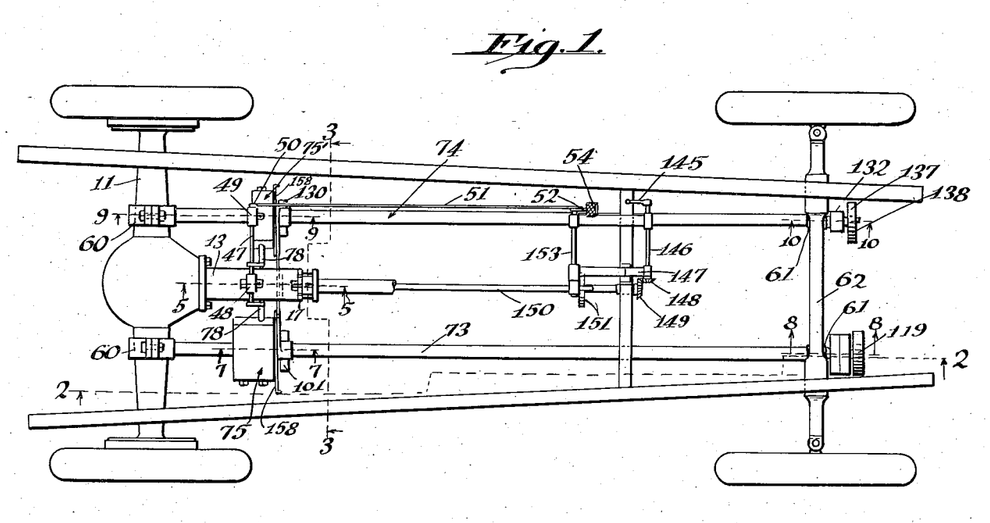
Figure 1 is a plan view of a vehicle chassis with my equipment attached thereto.

The forward parking wheel on the right hand side is mounted substantially as follows, having reference particularly to Figs. 1, 2 and 8:

The forward end of the shaft 73 has a flange 105 which is secured to a rear casing plate 106 by bolts 107, and this rear casing plate is secured to a front casing plate 108 by bolts 109. The forward casing plate has an antifriction bearing 110 which is mounted on the forward end 111 of the internal shaft 89, which shaft for sake of lightness is made hollow. A front parking wheel shaft 112 is mounted on a rear antifriction bearing 113 in the rear casing plate 106 Fig. 8 and on an antifriction bearing 114 on the front casing plate 108. Clamping nuts 115 are mounted on the shafts 96 and 112, respectively, holding the inner ball race of the antifriction bearings 97 and 114; and outer nuts 116 are utilized, being threaded in the arm 86 and the front casing plate 108, securing the outer race of the antifriction bearings 97 and 114, respectively. A cover plate 117 gives access to the clamping nut 118, and the front parking wheel 119 is keyed on the forward end of the shaft 112; this also preferably having a rubber tire 120.

Figure 10:
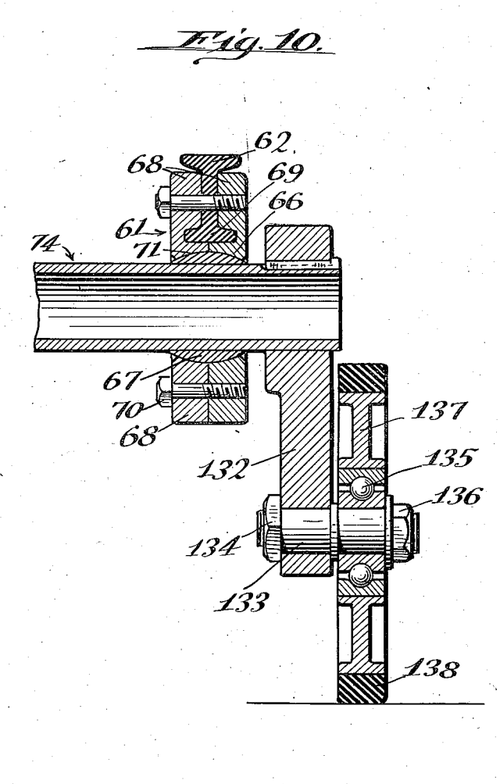
Figure 10 is a detail vertical longitudinal section on the line 10—10 of Fig. 1 in the direction of the arrows showing the forward non-driven parking wheels.

The parking wheels on the left hand side of the vehicle have a simpler mounting, this being illustrated particularly in Figs. 9 and 10. In this case an arm 125 is keyed on the shaft 74 and has a stud 126 secured to its free outer end by a nut 127. An antifriction bearing 128 is clamped on the outer end of this stud by a nut 129 and on this antifriction bearing there is mounted a rear parking wheel 130, also preferably having a rubber tire 131 (Fig. 9). At the forward end of the shaft 74 there is a forward arm 132 which is keyed thereon, and has a stud 133 secured thereto by a nut 134. On this stud there is an antifriction bearing 135 held in place by a nut 136 and on this antifriction bearing there is a front parking wheel 137 having a rubber tire 138.

It will be noted by reference to Fig. 9 that the transmission mechanism housing 75' is smaller and of simpler construction than the housing 75 on the right hand side of the vehicle.

Figure 7:
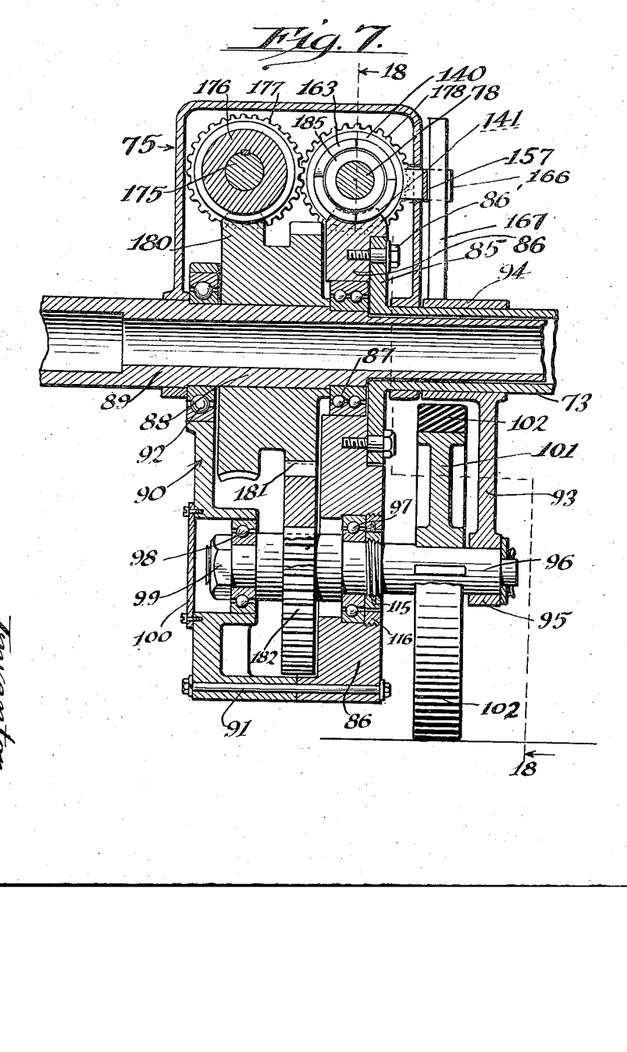
Figure 7 is a detail vertical longitudinal section on the line 7—7 of Figs. 1 or 3 in the direction of the arrows showing the driven parking wheels and the connection at the rear end.

The mechanism for depressing and lifting the parking wheels is substantially as follows, having reference particularly to Figs. 3, 4, 7, 8, 9 and 10:

Each of the shafts 78 has a worm 140 loose thereon which meshes with segmental worm wheel teeth 141 on the arm 86 on the right hand side of the vehicle, and on the arm 125 on the left hand side of the vehicle illustrated respectively in Figs. 7 and 9. As above mentioned, these shafts 78 are rotated in either direction, according to the direction of rotation of the propeller shaft, by shifting the clutch mechanism in the propeller shaft housing 13 by the operation of the foot pedal 22.

Figure 16:
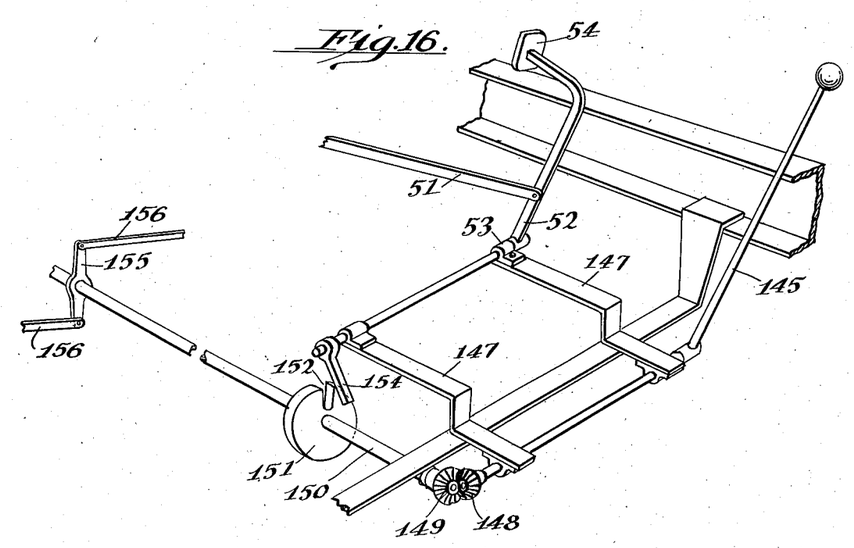
Figure 16 is a perspective view of the interlocking arrangement between the foot pedal and hand lever control of the propeller shaft drive and the control of the parking wheels.
Figure 17:
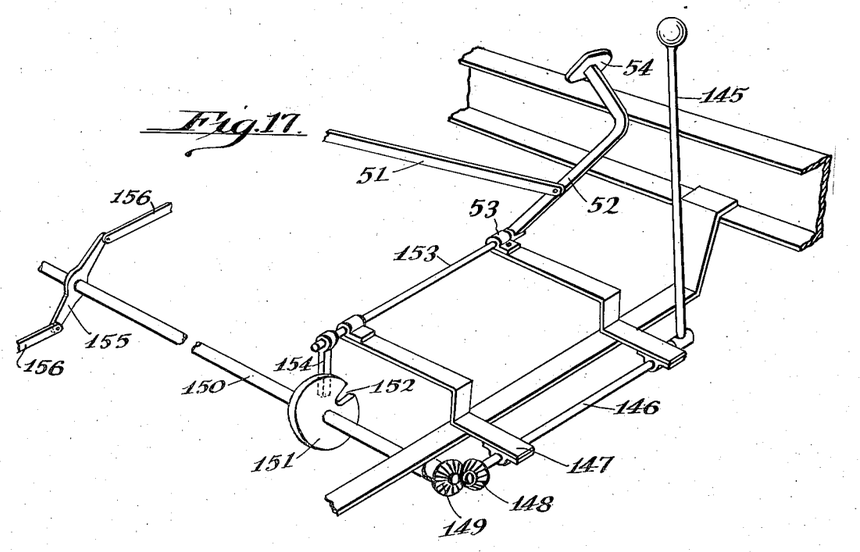
Figure 17 is a view similar to Fig. 16 showing the foot pedal depressed and interlocked with the hand lever which is under operation.

The operation of interconnecting the worms 140 with the shafts 78 is substantially as follows:—This includes the control mechanism having a hand lever 145. (Note Figs. 16 and 17.) This hand lever is mounted on a cross shaft 146 journaled in a suitable bracket frame 147 on the chassis of the vehicle and has a beveled pinion 148 at its end which meshes with another beveled pinion 149 on a longitudinal shaft 150. This shaft has an interlocking disk 151 thereon with a slot 152 therethrough. The foot pedal 52 is also mounted on a transverse rock shaft 153 and is journaled in the bracket frame 147 or other suitable frame, and has a rocking finger 154 thereon. In the normal inoperative position of the hand and foot levers, the finger 154 and the disk 151 occupy the position shown in Fig. 16. As soon as the foot pedal is operated to shift the vehicle drive from the propeller shaft 16 driving the differential mechanism to the drive of the gear 37, the finger 154 is rocked to the position shown in Fig. 17 passing through the slot 152, then on operating the hand lever 145, the disk is rotated and prevents the return motion of the foot pedal beyond the neutral position of the clutch 30', by engaging the finger 154 as shown in Fig. 17.

The clutch operating connection involves a double arm 155 mounted on the end of the shaft 150, and each end is connected by a link 156 to a slide bar 157, each of which is mounted on a slideway 158 on the housings 75 and 75', respectively. (Note particularly Figs. 3, 4 and 11 through 15.)

Figure 18:
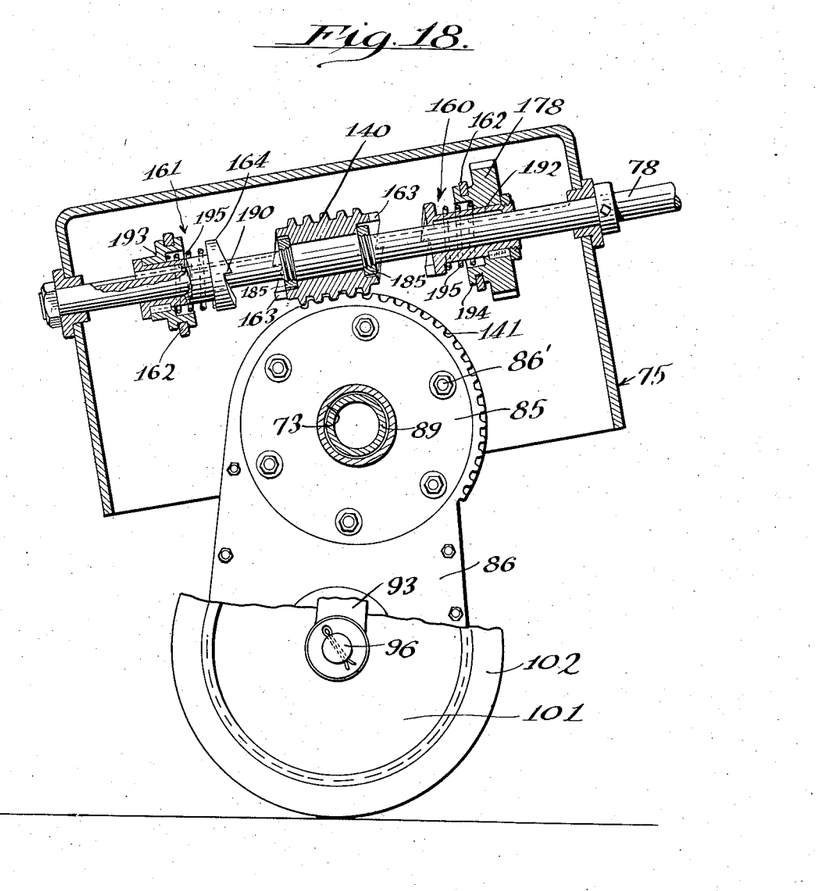
Figure 18 is a vertical transverse section on the line 18—18 of Fig. 7 in the direction of the arrows, showing the arms for raising and lowering the parking wheels, the worm for operating these arms and the clutches for engaging and disengaging the worm from the transverse drive shafts.

The clutch connection for raising and lowering the parking wheels is substantially as follows, having reference particularly to Figs. 11 through 15:

On each of the shafts 78 there is mounted an inner clutch 160 and an outer clutch 161, each of these clutches having arms 162 connected to the slide rod 157 so that these clutches operate in unison. Each end of the worm 140 is provided with a clutch element 163 to engage with the clutch elements 164 on the clutches 160 and 161, respectively (Fig. 18). The slide rod 157 is also provided with inner and outer stops 165 and 166 which are engaged by a clutch operating arm 167 which is connected to the hub 94 of the yoke arm 93 on the right and left hand sides of the vehicle (see Figs. 3 and 4). This stop arm has a straight section 168 to engage the stop 165 and the curved end 169 to engage the stop 166, these shifting the slide rod 157 to a certain extent in both positions of the parking wheels, that is when elevated and when completely depressed, as shown in Figs. 4 and 3.

Figure 11:
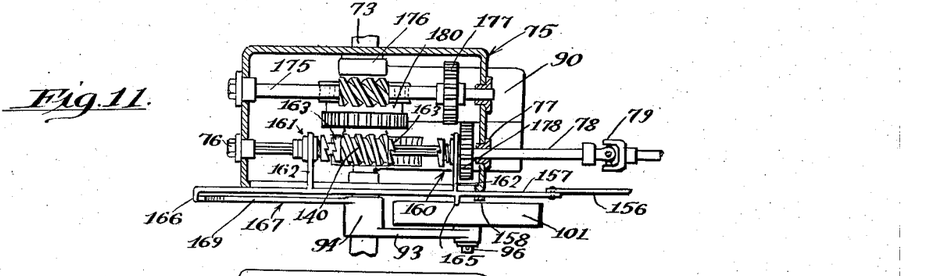
Figure 11 is a detail horizontal section on the line 11—11 of Fig. 4 through the parking transmission showing the clutch connection with the parking wheels up as in Fig. 4.

The wheels are normally carried elevated as shown in Fig. 4 with the clutches on the shafts 78 in the position shown in Fig. 11. By the action of the hand lever the clutches are shifted outwardly from the position of Fig. 11 to that of Fig. 12. This causes the clutch 160 to engage with the worm 140 and thus the worm 140 is rotated, and by intermeshing with the teeth 141 operates the arms 86 and 125 to depress the parking wheels from the position shown in Fig. 4 to engagement with the ground and to the position shown in Fig. 3.

Figures 12, 13:
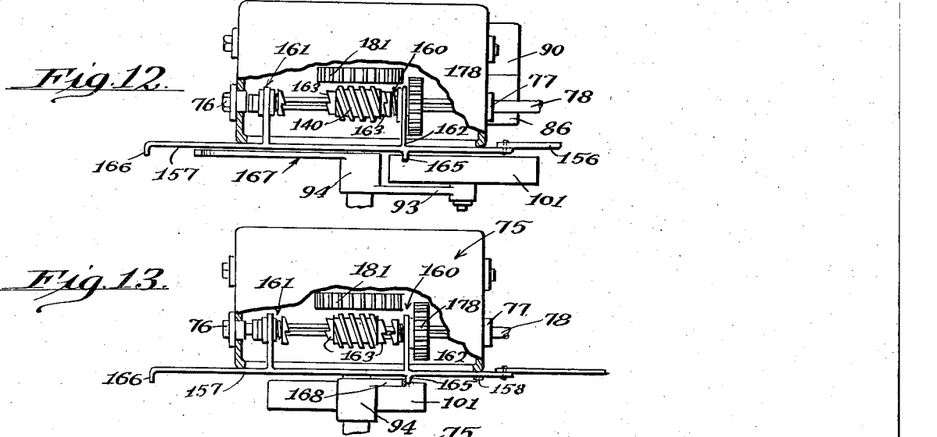
Figure 12 is a view similar to Fig. 11 showing the relation of the clutch when moving the parking wheels down.
Figure 13 is a view similar to Fig. 11 showing the clutch automatically disengaged when the parking wheels are down in the position of Fig. 3.

It will be noted that the wheels when moved fully outwardly, their axis is slightly outside of the center line of the tubular shafts 73 and 74, as shown in Fig. 3. When in this position the straight part 168 of the arms 167 engages the inner stops 165, thus shifting the slide rods 157 slightly inwardly and disengaging the clutches as shown in Fig. 13. When the wheels are in their depressed position, those on the right hand side may be rotated by driving mechanism hereunder described to shift the vehicle bodily sideways in one direction or the other.

Figure 15:
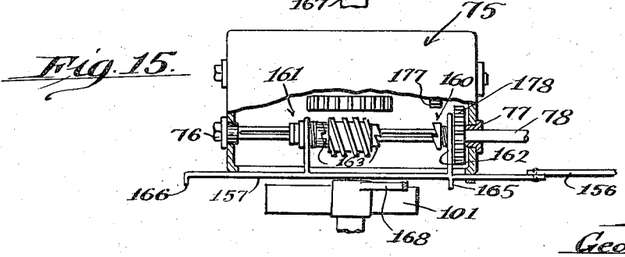
Figure 15 is a view similar to Fig. 11 showing the relation of the clutch and the gears for raising the parking wheels and lowering the vehicle onto the running wheels.

After this shifting operation and when it is desired to raise the parking wheels, the hand lever is actuated in the opposite direction, bringing the clutch 161 into engagement with the clutch on the worm 140 as shown in Fig. 15. This action then, due to the rotation of the shafts 78 in the reverse direction to that above described, lifts the parking wheels from the position shown in Fig. 3 to that of Fig. 4. In this action the curved end 169 of the arms 167 is brought into engagement with the outer stops 166 of the slide rods 157, shifting these slightly outwardly and disengaging the clutches 161 from the worm 140 as shown in Fig. 11.

The mechanism for driving a pair of the parking wheels to shift the vehicle bodily sideways is substantially as follows, having reference particularly to Figs. 7 and 8 and 11 through 15:

In the housing 75 there is journaled a counter-shaft 175 with a coarse gear 176 mounted thereon in a fixed position. There is also a fixed gear 177 which meshes with a driving gear 178 slidably mounted on the shaft 78 and connected to the clutch 160 to slide with this clutch (see Fig. 11). The coarse gear 176 meshes with an intermediate gear 180 which is keyed or otherwise secured to the enlarged end 88 of the inner shaft 89. This gear also has a set of teeth 181 which mesh with a driven gear 182 keyed to the shaft 96 which operates the parking wheel on the right hand side at the rear (Fig. 7). The forward end of the shaft 89 has a transmission gear 183 connected thereto which meshes with the driven gear 184 keyed or otherwise secured to the shaft 112 on which the forward parking wheel on the right hand side is connected (Fig. 8).

Figure 14:
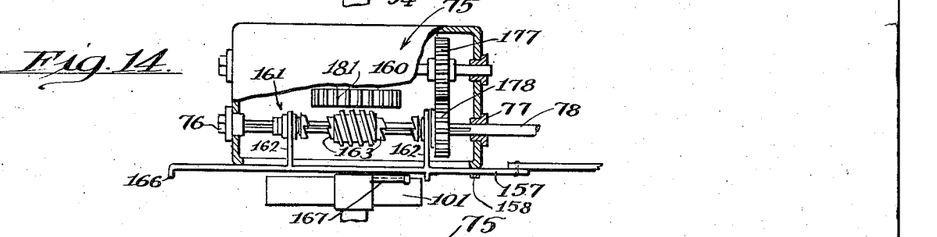
Figure 14 is a view similar to Fig. 11 showing the relation of the clutch and gears for moving the car sideways as to the curb.

The operation of driving the parking wheels on the right hand side is as follows:

In shifting the clutch 160 from the position shown in Fig. 11 to that of Fig. 12, as above described, the teeth of the gear 178 pass through the teeth of the gear 177, and the rotation of this latter gear and the shaft 175 is immaterial as in this position the parking wheels are elevated above the ground. After the parking wheels have been lowered and the clutch 160 disengaged from the worm 140, as illustrated in Fig. 13, this being done automatically, the hand lever is then operated to shift the clutch 160 and carry the gear 178 into mesh with the gear 177, as shown in Fig. 14. Then when the propeller shaft of the vehicle is being driven, for instance, for forward travel, the shaft 78 transmits motion to the shaft 175 and this, through the medium of the coarse gear 176, operates the gear 180, which, being secured to the inner shaft 89, rotates this inner shaft. This action communicates motion to the driven gears 182 and 184 through the gear teeth 181 and the gear 183, hence rotating the shaft 96 and 112, respectively, and driving the rear and forward parking wheels on the right hand side of the vehicle. This carries the vehicle bodily to one side and this may be to the right hand side for parking against the curb.

When it is desired to move the vehicle laterally in the opposite direction, the transmission is reversed so that the propeller shaft operates in a reverse direction as for backing. The above mentioned gear trains then rotate the parking wheels on the right hand side in the reverse direction.

It will be noted that in all positions for raising and lowering the parking wheels that the gears 178 and 177 are out of mesh so that the parking wheels cannot be rotated in such action. However, when the wheels engage the ground and until they have the vehicle fully elevated, they must roll slightly on the ground and communicate a rotating motion to the inner shaft 89. On account of the coarse gear connection between the gears 176 and 180, the shaft 175 can be freely rotated, as there is no strain on this shaft.

It will be noted by reference to Figs. 7 and 8 that the yoke arm 93 and the hub 94 are substantially the same so that in the operation of raising and lowering the parking wheels on opposite sides, the arms 168 operate the clutches automatically and simultaneously.

In order to prevent longitudinal shifting of the worm 140 on the shaft 78 (note Fig. 18) lock nuts 185 are secured on the shaft 78 at opposite ends of the worm. These, however, allow the shaft 78 to rotate through the worm which is held stationary when the parking wheels are on the ground during the sidewise movement of the vehicle.

It is to be noted that the worm 176 (Fig. 11) is purposely made with a steep enough pitch to allow the parking wheels to rotate slightly as the arms are raised to lower the car, these wheels being rotated in being drawn transversely of the vehicle in contact with the ground. When this action is performed, there is no resistance to the rotation of the worm 176 or the shaft 175.

Another object of this invention is to provide means for raising a car off the tires when parking for a long time in a garage; also to furnish a ready jack for removing tires, or for inspection of wheel balance or alignment, etc.

It is desirable to have the clutches 160 and 161 on the shaft 78, which engage with the worm 140, acting in opposite directions so that if the wrong clutch is connected to the worm the action would be inoperative, and thus prevent damage to the mechanism by the attempt to swing the arm to a further extent when it is fully depressed or fully raised, by the propeller shaft being rotated in opposite directions. This construction is illustrated particularly in Fig. 18. The clutches 160 and 161 are shown having clutch jaws with ratchet type of teeth 190 which face in opposite directions on each of these clutches. Also the teeth 163 on the worm 140 face in opposite directions to engage with the respective clutch jaws on the clutches 160 and 161.

In order to allow a resilient action of these clutches should the wrong clutch be engaged, the clutch jaws are mounted on sleeves 192, which sleeves are slidable in the collar 193 of the outer clutch, and the gear 178. The collar 193 and the gear 178 have grooves 194 to receive the clutch arms 162. Compression springs 195 coiled on the sleeves 192 and bearing respectively against the collar 193 and the gear 178 for each of the clutches allow retraction of the clutch jaws.

It is optional which manner of direction of rotation of the propeller shaft is used to lower the parking wheels and to raise the parking wheels; but it is desirable to have the engine drive the propeller shaft in low gear for one direction of movement of the parking wheels, and in reverse gear for the other direction of movement. Therefore, should the driver of the vehicle have the propeller shaft drive in the wrong gear, i. e. rotating in the wrong direction from that intended, and operate the foot pedal control and also the hand lever control, no harm can be done. If the propeller shaft is turning in the wrong direction and an attempt is made to engage the clutch elements 163 on the worm 140, the clutches will merely rotate the compression springs 195, allowing the ratchet teeth of the clutch elements 164 and the clutch elements 163 on the worm to slip past each other. Whereas, if the propeller shaft is rotating in the direction desired and for which the mechanism is planned and the correct clutch 160 or 161 engaged with the worm 140, the raising and lowering of the parking wheels will function in the correct manner. Therefore, a driver inadvertently operating the parking mechanism when the propeller shaft is rotating in the wrong direction can do no harm.

In the specification and claims, where I use the expression "propeller shaft" or the equivalent, I intend to refer to the shaft which substantially directly transmits the power to the differential in contradistinction to a shaft connecting the engine to the gear shift box or gear shift mechanism. This construction is advantageous for deriving power for a parking construction, in that the power takeoff is adjacent the rear axle.

Various changes may be made in the principles of my invention without departing from the spirit thereof, as set forth in the description, drawings and claims.

I claim:

1. In the art described, a vehicle having a chassis and running wheels, a pair of longitudinally extending shafts, means connecting said shafts to the chassis, arms mounted on said shafts, parking wheels connected to said arms, a propeller shaft operating on the differential to drive the running wheels, and means to interconnect the propeller shaft with the longitudinal shafts to rock said shafts and swing the said arms, depressing and elevating the parking wheels.

2. In the art described, as claimed in claim 1, one of said shafts being formed in two parts with an internal shaft projecting from opposite ends, a gear train connected to the internal shaft and having a driving connection with two of the parking wheels, and means to operate the internal shaft from the propeller shaft of the vehicle.

3. In the art described, the combination of a vehicle having running wheels, a propeller shaft operating on the differential with means thereon to drive the rear running wheels, a clutch on the propeller shaft, a foot lever having means to operate said clutch, a gear engageable by said clutch, a transverse shaft driven by said gear and having a worm loosely mounted thereon, a second clutch slidable on the transverse shaft, a hand lever with means connecting said lever to the second clutch, parking wheels, and means actuated by the said worm to raise and lower the parking wheels, said worm being rotated by the transverse shaft by operation of the second clutch.

4. In the art described, as claimed in claim 3, means interlocking the foot lever and the hand lever whereby, on operation of the foot lever and after movement of the hand lever, the foot lever is prevented from returning to its original position until the hand lever is also returned to its original position.

5. In the art described, as claimed in claim 3, a gear train, connected to at least one of the parking wheels, a countershaft having gears thereon, one of such gears operating with the gear train, a second gear on the counter shaft, a slidable gear on the transverse shaft, said latter gear being connected to the clutch and slidable with the clutch to transmit motion to the parking wheels when said wheels engage the ground.

6. In the art described, a vehicle having a pair of longitudinal shafts, arms connected to said shafts, parking wheels mounted on said arms, a pair of transverse shafts each having a gear loose thereon and meshing with a gear connected to said arms to move the parking wheels, means to drive said transverse shafts simultaneously, clutches in two parts slidably mounted on the transverse shafts to engage opposite ends of the gears on said shafts, means to shift said clutches to bring one of said parts into engagement with one end of the said gears, and means interconnected between the clutches and the parking wheels to disengage said clutch after a predetermined movement of the parking wheels.

7. In the art described, as claimed in claim 6, one of the parts of the clutches being engaged with the gears on the transverse shafts on lowering of the parking wheels and the other part of the clutches being engaged with the other ends of the said gears on the raising motion of said parking wheels, the means to disengage said clutches operating when the wheels are fully depressed and fully elevated.

8. In the art described, the combination of a vehicle having a tubular longitudinal shaft, arms connected to said shaft, parking wheels on each of said arms, a transverse shaft, a first gear loose on said shaft meshing with a gear connected to one of the arms, a clutch in a plurality of parts slidable on the transverse shaft, a counter shaft, an internal shaft mounted in the tubular shaft, a second gear on the counter shaft, a gear train between said internal shaft and the second gear, means to drive the parking wheels from the internal shaft, a third gear fixed on the counter shaft, a slidable gear mounted on the transverse shaft and connected to the clutch, said slidable gear transmitting motion to rotate the parking wheels through the medium of the counter shaft and the said clutch engaging and disengaging the first ear from the transverse shaft to raise and lower the parking wheels.

9. In the art described, the combination of a vehicle having a propeller shaft, means to rotate said propeller shaft in different directions for forward and reverse travel, means to drive a transverse shaft from the propeller shaft, a pivotally mounted arm having a parking wheel thereon, a gear loose on a transverse shaft engaging a gear on the said arm, a pair of clutches slidable on the transverse shaft on opposite sides of the gear on the shaft, said clutches and the gear having interacting clutch elements to engage the gear, each on an opposite direction of rotation of the transverse shaft, means to shift said clutches, and means to allow slipping of the clutches should the wrong clutch be engaged with the said gear.

10. In the art described, the combination of a vehicle having a propeller shaft rotatable in opposite directions with means to drive the driving wheels from the shaft, a transverse shaft, means to disengage the drive from the driving wheels to the transverse shaft, a pivotally mounted arm on a frame structure connected to the vehicle, said arm having a gear and a parking wheel, the transverse shaft having a worm rotatable thereon engaging the gear on the arm, a pair of clutches slidable and rotatable with the transverse shaft on opposite sides of the worm.

clutch jaws on the worm, the clutches being positioned in opposite direction to drive the worm during opposite rotations of the transverse shaft, springs to allow slippage of the clutch jaws should the wrong clutch jaws be engaged, and means to shift said clutches simultaneously in opposite directions.

11. In the art described, a vehicle having running wheels, a propeller shaft, a sleeve on said shaft having a gear connected thereto, said gear being adapted to drive at least one of the running wheels, a clutch on the propeller shaft, a gear loosely mounted on said shaft, means to shift the clutch to engage either the sleeve or the said gear, a plurality of parking wheels, means to raise and lower said parking wheels operated by the said gear, the means to raise and lower the parking wheels including transverse shafts, arms to which the parking wheels are connected, means to operate said arms from the transverse shafts, a gear mechanism connected to at least one of the parking wheels, a counter shaft with gears thereon engaging with said gear mechanism, and a gear slidable on one of the transverse shafts to operate the counter shaft.

In testimony whereof I have signed my name to this specification.

GEORGE W. WOOLLEY.